United States Patent
Snow et al.

[11] 3,925,954
[45] Dec. 16, 1975

[54] CORNER BRACKET WITH HIP SADDLE

[76] Inventors: Kenneth T. Snow, 1303 N. Cross St., Wheaton, Ill. 60187; Kenneth T. Snow, Jr., 317 Shagbark Court, Schaumburg, Ill. 60172

[22] Filed: Sept. 24, 1973

[21] Appl. No.: 400,009

[52] U.S. Cl. .................. 52/752; 403/219; 403/403; 403/406
[51] Int. Cl.² ............................................ F16B 7/00
[58] Field of Search ........... 403/217, 219, 231, 403, 403/218, 406, 188, 205; 248/188, 165; 52/751, 752, 753 D, 753 C, 288, 289

[56] References Cited
UNITED STATES PATENTS

| | | | |
|---|---|---|---|
| 230,438 | 7/1880 | Porter | 52/753 D |
| 1,141,210 | 6/1915 | Pirson | 403/231 |
| 1,380,518 | 6/1921 | Bellig | 403/219 |
| 1,559,582 | 11/1925 | Nelessen | 52/289 X |
| 1,988,388 | 1/1935 | Mioton | 52/92 |
| 2,768,434 | 10/1956 | Taylor | 403/217 |

FOREIGN PATENTS OR APPLICATIONS

| | | | |
|---|---|---|---|
| 339,146 | 2/1936 | Italy | 403/217 |

*Primary Examiner*—Werner H. Schroeder
*Assistant Examiner*—Wayne L. Shedd
*Attorney, Agent, or Firm*—Kenneth T. Snow

[57] ABSTRACT

A corner bracket constructed to join building walls at right angles and to provide a saddle for a roof hip rafter.

3 Claims, 5 Drawing Figures

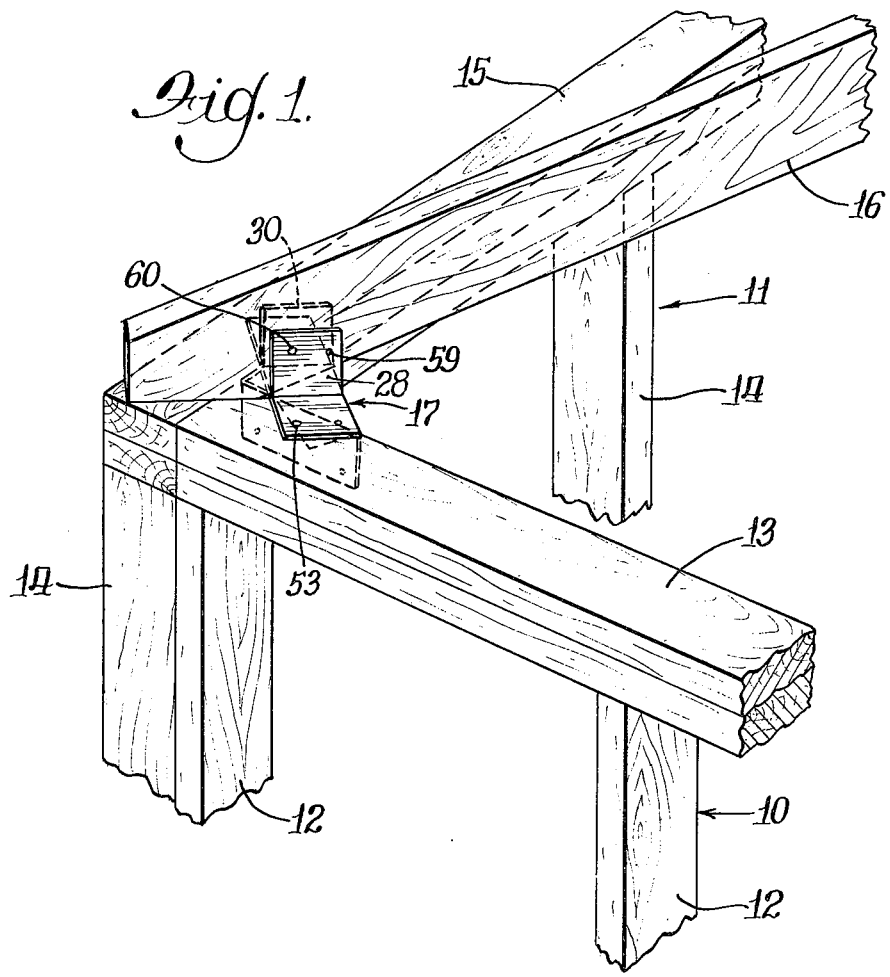
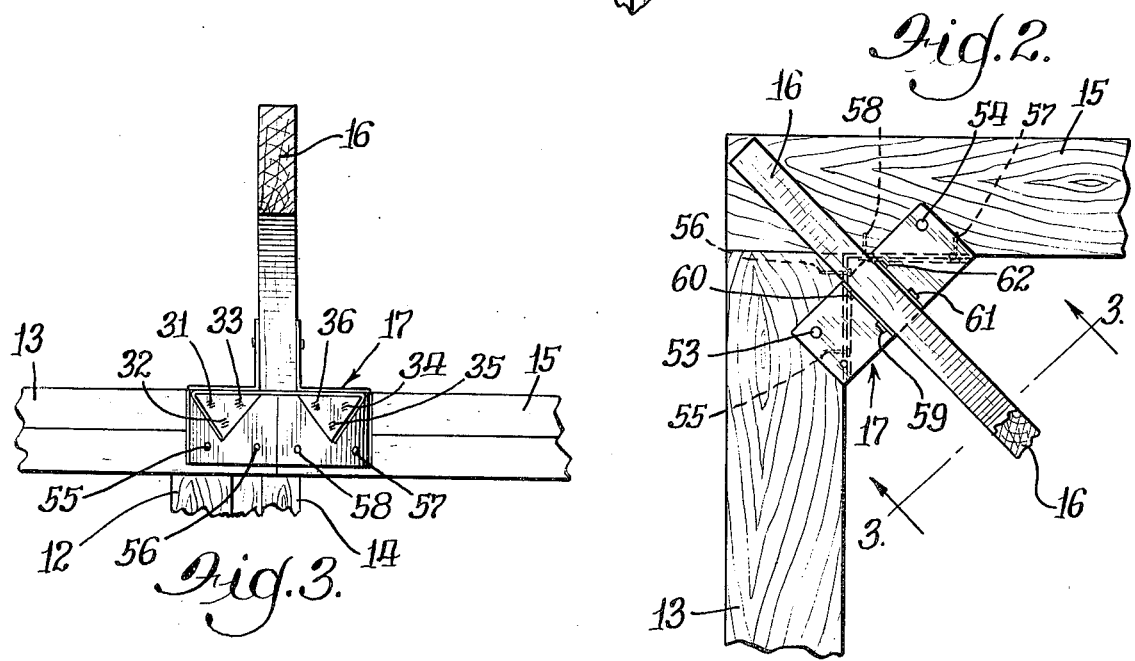

CORNER BRACKET WITH HIP SADDLE

BACKGROUND OF THE INVENTION

1. Field of the Invention

The construction of buildings with wood framing is constantly becoming more automated. Wall sections are being factory fabricated and assembled on the job site. Other parts of the buildings are also being prefabricated.

Job site assembly hardware is an important adjunct to these advanced building techniques. The present corner bracket facilitates the firm locking of wall sections together in proper right angle relationship and at the same time provides a saddle for a roof hip rafter at 45° relative to the right angle corner formed by the adjoining walls.

2. Description of the Prior Art

Metal brackets for joining wood have been made in many and varied forms. Framing anchors are common in the building industry. However, a patent search on this subject device has confirmed our belief that no one heretofore has conceived of a device such as defined herein.

SUMMARY OF THE INVENTION

A principal object of the present invention is to provide a novel rigid bracket which may be used to simultaneously join wall sections at right angles and to provide a saddle or socket for a roof hip rafter at a fixed 45° angle relative to the corner.

An important object of this invention is to provide a novel means for constructing a combination bracket for joining wood members together.

Another important object of this invention is to provide a novel corner bracket with a hip saddle which aids carpenters in the job site assembly of wall and roof members.

Other and further important objects and advantages will become apparent from the disclosures in the following specification and the accompanying drawings.

In the drawings:

FIG. 1 is a perspective view of a portion of the wood framing of a building and particularly showing adjoining wall sections and a roof hip rafter and including the bracket of this invention.

FIG. 2 is a top plan view of the assembly of FIG. 1.

FIG. 3 is an elevational detail view partially in section of the device as taken on the line 3—3 of FIG. 2.

As shown in the drawings:

Figure 4:
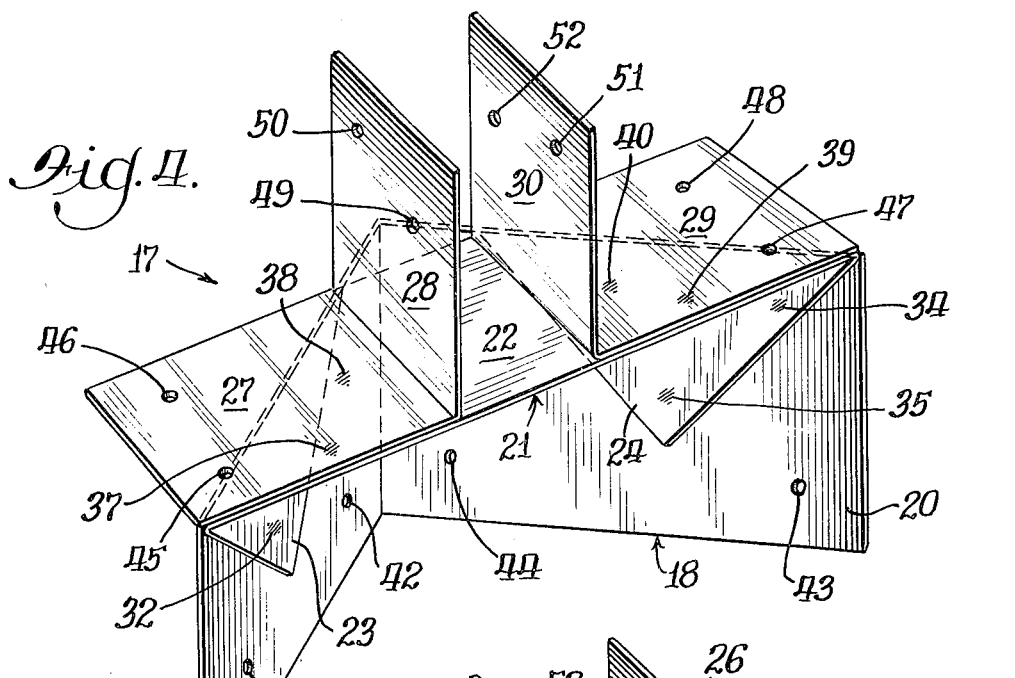
FIG. 4 is an enlarged perspective view of the corner bracket with hip saddle of this invention.

The reference numeral 10 indicates generally a first wood fabricated wall. A second wood fabricated wall 11 is disposed at right angles to the first wall 10. The first fabricated wall includes spaced apart vertical wood studs 12 which are joined at their upper ends with a double top plate 13. Similarly the second wall 11 includes spaced apart vertical wood studs 14 having their upper ends joined with a double top plate 15. The first and second walls 10 and 11 depict a right angle corner for a building.

A roof hip rafter 16 preferably bisects the right angle corner so that it sets at a 45° angle with respect to the corner. The hip rafter is inclined inwardly and upwardly for joining with a ridge board (not shown) at the top of the roof.

The corner bracket of this invention is designated generally by the numeral 17. The construction of the bracket is best shown in the exploded view of FIG. 5. The bracket includes a right angled corner member 18 having side walls 19 and 20. A bridge member 21 includes a central portion 22 and downwardly bent triangularly shaped end wings 23 and 24. The triangular wings are disposed at right angles to the central portion 22. The hip rafter saddle is comprised of a first L shaped member 25 and a second spaced apart and oppositely disposed L shaped member 26. The L member 25 has a generally horizontal portion 27 and an adjoining vertical portion 28. Similarly the L member 26 has a generally horizontal portion 29 and an adjoining vertical portion 30.

Figure 5:
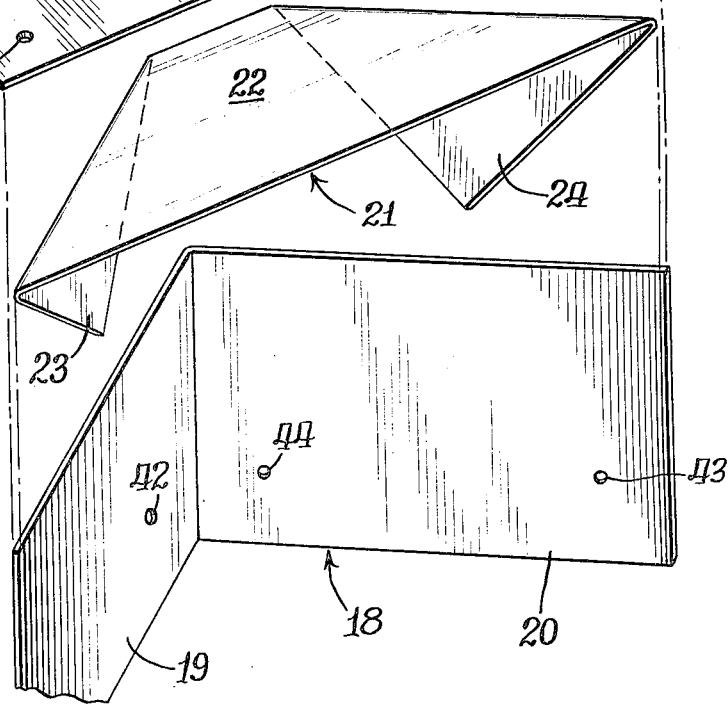
FIG. 5 is an exploded view in perspective showing the several component parts of the corner bracket of FIG. 4.

The assembly of these several sheet metal parts as shown in FIG. 5 is accomplished by spot welding as shown in the assembly of the entire bracket in FIG. 4. The wing 23 of the bridge member 21 is welded at spaced apart spots 31, 32 and 33 to the side wall 19 of the right angled corner member 18. Similarly the wing 24 of the bridge member 21 is welded at spaced apart spots 34, 35 and 36 to the side wall 20 of the right angled corner member 18. The horizontal portion 27 of the L member 25 is welded to the central portion 22 of the bridge member 21 at spaced apart spots 37 and 38. Similarly the horizontal portion 29 of the L member 26 is welded to the central portion 22 of the bridge member 21 at spaced apart spots 39 and 40. The result of the spot welding is a rigid corner bracket with hip saddle as shown in FIG. 4.

The corner bracket is fastened to the wood wall sections and the hip rafter by nails and the bracket is provided with strategically placed nail holes. The side wall 19 of the angled corner 18 is provided with spaced apart nailing holes 41 and 42. Similarly spaced apart nailing holes 43 and 44 are provided in the side wall 20 of the angled corner 18. Spaced apart nailing holes 45 and 46 are provided in the horizontal portion 27 of the first L shaped saddle member 25. Similarly spaced apart nailing holes 47 and 48 are provided in the horizontal portion 29 of the second saddle L shaped member 26. Only one of each of these two pairs of holes 45 and 46, and 47 and 48 are designed to receive nails, but with this construction the first and second L shaped saddle members are interchangeable. As shown in FIG. 4 the holes 45 and 47 are disposed directly above the side walls 19 and 20 respectively of the angled corner member 18 and hence cannot be used but their presence does not interfere with the use of the bracket. The holes 46 and 48 are in those portions of the horizontal portions of the L members which are disposed rearwardly of the walls 19 and 20 and may generally be termed top flanges. The vertical portion 28 of the first saddle L member 25 is provided with laterally spaced apart nailing holes 49 and 50. It should be noticed that these holes are also vertically offset. The vertical portion 30 of the second L shaped member 26 is similarly provided with laterally spaced apart and vertically offset nail holes 51 and 52. The vertical portions 28 and 30 are adapted to flank the sides of a hip rafter and the nail holes are used to insert nails through the bracket into the rafter. The vertical offsetting of the holes prevents the nails striking each other when nails are inserted from both sides of the rafter. The hole 49 is disposed below its counterpart hole 51 on the opposite side and likewise the hole 50 is disposed above its counterpart hole 52 on the opposite side.

The corner bracket 17 is set into the inside corner of the adjoining double top plates 13 and 15 of the first and second fabricated walls 10 and 11 respectively. The side 19 of the right angled corner member 18 abuts against the side of the top plate 13 while the side 20 abuts against the side of the top plate 15. The top flange portions of the horizontal members 27 and 29 lying outside the side walls 19 and 20 are adapted to rest on top of the top plates 13 and 15 respectively. The corner bracket is thus perfectly positioned with respect to the top inside corner of the adjoining walls. A nail 53 is driven through the hole 46 into the top of the top plate 13. Another nail 54 is driven through the hole 48 and into the top of the top plate 15. Now, nails 55 and 56 are driven through the holes 41 and 42 into the side of the double top plate 13, and finally nails 57 and 58 are driven through the holes 43 and 44 into the side of the double top plate 15. This securely locks the corner bracket 17 into the corner of the wall sections and of course locks the wall sections together in a manner to resist any separation. The corner bracket is thus a steel reinforcement for the building and makes that building resistant to windstorms of any intensity.

With the corner bracket so set the hip saddle is automatically positioned to properly receive a hip rafter so that the rafter bisects the angle in which the corner bracket is set. Nails 59 and 60 are then driven through the holes 49 and 50 into the side of the hip rafter 16. Similarly nails 61 and 62 are driven through the holes 51 and 52 into the other side of the hip rafter 16. This nail attachment of the roof hip rafter to the bracket 17 insures a firm, positive attachment of the hip rafter with the wall sections 10 and 11 on which it is adapted to rest.

OPERATION OF THE DEVICE

The rearwardly extending flanges of the horizontal portions 27 and 29 of the bracket sit on the top plates 13 and 15 of the adjoining walls 10 and 11 and make perfect guides for setting the brackets 17. Nailing of the bracket to the wall sections is then accomplished by employing nails and driving them through the holes provided therefor and into the wood members. Now a carpenter need not do any line scribing or use a protractor. All he has to do to properly set his hip roof is to place a rafter in the saddle disposed at 45° relative to the corner. The roof is perfectly aligned for angle of hip rafter and simultaneously the several components of the corner and roof are securely locked together to produce a building fully resistant to tornados or wind storms.

We are aware that numerous details of construction may be varied throughout a wide range in the constructing of the within described corner bracket with hip saddle and it is not our intention to limit the patent granted hereon otherwise than as necessitated by the appended claims.

What is claimed is:

1. A building corner bracket with a hip saddle for wood framed buildings of the type having walls disposed at right angles to one another and each wall having vertically disposed spaced apart wooden studs with adjoining wooden top plates, comprising an angled member with vertical side walls disposed at right angles to one another, a horizontally extending diagonally disposed bridge member spanning the inside space between the vertical side walls of the angled member and acting to reinforce the spacing of the vertical side walls, said bridge member integrally fastened to and located at the top of the angled member, a pair of angle members having horizontal and vertical sides, said horizontal sides integrally joined to the top side of the bridge member in spaced apart relationship, and each angle member having a portion of its horizontal side extending beyond the vertical side walls of the angled member and lying generally in the same plane as the bridge member and acting as top flanges adapted to lie on the top surface of the adjoining wooden top plates, and the vertical sides of the pair of angle members together with the bridge member acting as a saddle adapted to receive a roof hip rafter whereby the vertical sides of the pair of angle members are adapted to abut opposite sides of the roof hip rafter.

2. A device as set forth in claim 1 in which the bridge member has a central portion and downwardly bent triangularly shaped end wings disposed at right angles to the central portion and adapted to abut and be integrally fastened to the inner vertical side walls of the angled member.

3. A device as set forth in claim 2 in which the triangularly shaped end wings of the bridge member are weldably attached to the side walls of the angled member, and the horizontal sides of the pair of angle members are weldably attached to the top of the central portion of the bridge.

* * * * *